United States Patent
Sipcic et al.

(10) Patent No.: US 11,212,129 B1
(45) Date of Patent: Dec. 28, 2021

(54) PROFILE VIRTUAL CONFERENCE ATTENDEES TO ENHANCE MEETING INTERACTIONS

(71) Applicant: INTERNATIONAL BUSINESS MACHINES CORPORATION, Armonk, NY (US)

(72) Inventors: Slobodan Sipcic, Bethesda, MD (US); Priyansh Jaiswal, Boca Raton, FL (US); Peeyush Jaiswal, Boca Raton, FL (US); Paul Llamas Virgen, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/302,194

(22) Filed: Apr. 27, 2021

(51) Int. Cl.
*G06F 15/16* (2006.01)
*H04L 12/18* (2006.01)
*H04L 12/873* (2013.01)

(52) U.S. Cl.
CPC ...... *H04L 12/1818* (2013.01); *H04L 12/1822* (2013.01); *H04L 47/522* (2013.01)

(58) Field of Classification Search
None
See application file for complete search history.

(56) References Cited

U.S. PATENT DOCUMENTS

| | | | |
|---|---|---|---|
| 7,007,235 B1 * | 2/2006 | Hussein | H04L 12/1822 715/751 |
| 7,843,486 B1 | 11/2010 | Blair | |
| 8,627,210 B2 | 1/2014 | Vijayakumar | |
| 9,100,540 B1 | 8/2015 | Gates | |
| 9,372,543 B2 | 6/2016 | Lo | |
| 9,674,243 B2 | 6/2017 | Bader-Natal | |
| 2007/0263805 A1 | 11/2007 | McDonald | |

(Continued)

FOREIGN PATENT DOCUMENTS

WO WO-2018231306 A1 * 12/2018 ........... H04L 65/602

OTHER PUBLICATIONS

IndustryArc, "Web Conferencing Market—Forecast(2021-2026)," IndustryArc.com, [accessed Feb. 11, 2021], Retrieved from the Internet: https://www.industryarc.com/Report/15472/web-conferencing-market.html, 10 pages.

(Continued)

*Primary Examiner* — Phyllis A Book
(74) *Attorney, Agent, or Firm* — Robert R. Aragona (57) ABSTRACT

An embodiment for profiling virtual conference attendees to enhance meeting interactions is provided. The embodiment may include receiving permission from one or more users to monitor one or more IoT devices for data associated with each user. The embodiment may also include selecting an initial weight for the IoT devices. The embodiment may further include analyzing the data for a trigger event. The embodiment may also include in response to determining at least one of the one or more users intends to participate, adding the at least one user to a dynamic participation queue. The embodiment may further include assigning a time interval for which each user who was added to the dynamic participation queue is able to participate. The embodiment may also include creating a dynamic profile for each user in attendance.

20 Claims, 7 Drawing Sheets

(56) References Cited

U.S. PATENT DOCUMENTS

| | | | | |
|---|---|---|---|---|
| 2012/0331401 | A1* | 12/2012 | Tipirneni | G06F 16/951 |
| | | | | 715/753 |
| 2013/0018960 | A1* | 1/2013 | Knysz | H04L 65/403 |
| | | | | 709/204 |
| 2013/0268598 | A1* | 10/2013 | Tipirneni | G06F 3/011 |
| | | | | 709/204 |
| 2016/0073058 | A1* | 3/2016 | Bader-Natal | G06F 3/0482 |
| | | | | 348/14.03 |
| 2017/0093967 | A1* | 3/2017 | Grosz | H04L 51/32 |
| 2017/0353508 | A1* | 12/2017 | Yoakum | G06F 3/04817 |
| 2017/0353694 | A1* | 12/2017 | Yoakum | G06F 3/165 |
| 2018/0216946 | A1* | 8/2018 | Gueye | H04W 4/029 |
| 2018/0286388 | A1 | 10/2018 | Kawachi | |
| 2019/0273767 | A1* | 9/2019 | Nelson | H04L 65/403 |
| 2021/0042724 | A1* | 2/2021 | Rathod | G06Q 30/06 |

OTHER PUBLICATIONS

Mell et al., "The NIST Definition of Cloud Computing", National Institute of Standards and Technology, Special Publication 800-145, Sep. 2011, 7 pages.

\* cited by examiner

PROFILE VIRTUAL CONFERENCE ATTENDEES TO ENHANCE MEETING INTERACTIONS

BACKGROUND

The present invention relates generally to the field of computing, and more particularly to a system for profiling virtual conference attendees to enhance meeting interactions.

Video conferencing in online collaborative meetings through a variety of desktop and mobile collaborative meeting applications, as well as online collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. In an online collaborative meeting, multiple users, i.e., attendees in the online collaborative meeting, may intend to participate at specific times during the meeting. In order to preserve the quality of communication and coherence in the online collaborative meeting, several factors associated with the users may be considered.

SUMMARY

According to one embodiment, a method, computer system, and computer program product for profiling virtual conference attendees to enhance meeting interactions is provided. The embodiment may include receiving permission from one or more users to monitor one or more IoT devices for data associated with each user during an online meeting. The embodiment may also include selecting an initial weight for the one or more IoT devices in response to receiving permission from the one or more users. The embodiment may further include analyzing the data for a trigger event. The embodiment may also include in response to determining at least one of the one or more users intends to participate, adding the at least one user to a dynamic participation queue. The embodiment may further include assigning a time interval for which each user who was added to the dynamic participation queue is able to participate in response to adding the at least one user to the dynamic participation queue.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for profiling virtual conference attendees to enhance meeting interactions. The following described exemplary embodiments provide a system, method, and program product to, among other things, detect an intent of a user to participate in an online collaborative meeting and, accordingly, add the user to a dynamic participation queue. Therefore, the present embodiment has the capacity to improve the technical field of e-conferencing applications by making a user's participation in the meeting more fluent and eliminating time spent in selecting a particular participant to speak in the meeting, thus making online collaborative meetings more efficient. Also, some embodiments of the present invention have the capacity to improve a computer by presenting to users in the online collaborative meeting a flexible and easy-to-understand graphical user interface (GUI).

As previously described, video conferencing in online collaborative meetings through a variety of desktop and mobile collaborative meeting applications, as well as online collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. In an online collaborative meeting, multiple users, i.e., attendees in the online collaborative meeting, may intend to participate at specific times during the meeting. In order to preserve the quality of communication and coherence in the online collaborative meeting, several factors associated with the users may be considered. It is often difficult to properly select who should participate in such online collaborative meetings, especially where dozens or even hundreds of individuals are attending the meeting. This problem is typically addressed by capturing a set of images of a main speaker during the online collaborative meeting and using machine learning (ML) techniques to determine a gaze direction of the main speaker based on the captured set of images. However, capturing a set of images fails to consider a variety of other factors that may be relevant in determining whether a user intends to participate in the online collaborative meeting as a speaker. It may therefore be imperative to have a system in place to manage and control interactions between various users in an online collaborative meeting setting. Thus, embodiments of the present invention may provide advantages including, but not limited to, maintaining efficiency and productivity during an online collaborative meeting, reducing background noises emanating from devices of non-participating users, and automatically unmuting and muting microphones on the devices of the users when a particular user is speaking and finished speaking, respectively. The present invention does not require that all advantages need to be incorporated into every embodiment of the invention.

According to at least one embodiment, when an online meeting host is giving a presentation, the one or more users attending the meeting may give permission to monitor IoT devices for data associated with the one or more users. In response to giving permission to monitor the IoT devices, an initial weight may be selected for the IoT devices and the data associated with the one or more users may be analyzed for a trigger event in order to determine whether the one or more users intend to participate in the online meeting. According to at least one embodiment, the trigger event may be an increased heartrate of the one or more users. According to at least one other embodiment, the trigger event may be gestures made by the one or more users. For example, the gesture may be a hand gesture or a facial gesture. According to at least one further embodiment, the trigger event may be a change in a voice volume or tone of the one or more users. Additional embodiments concerning the trigger event are described in further detail below with respect to FIG. 2. In response to determining at least one user of the one or more users intends to participate in the online meeting, the at least one user may be added to a dynamic participation queue so that a time interval for which each user who was added to the dynamic participation queue is able to participate may be assigned.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to detect an intent of a user to participate in an online collaborative meeting and, accordingly, add the user to a dynamic participation queue.

Figure 1:
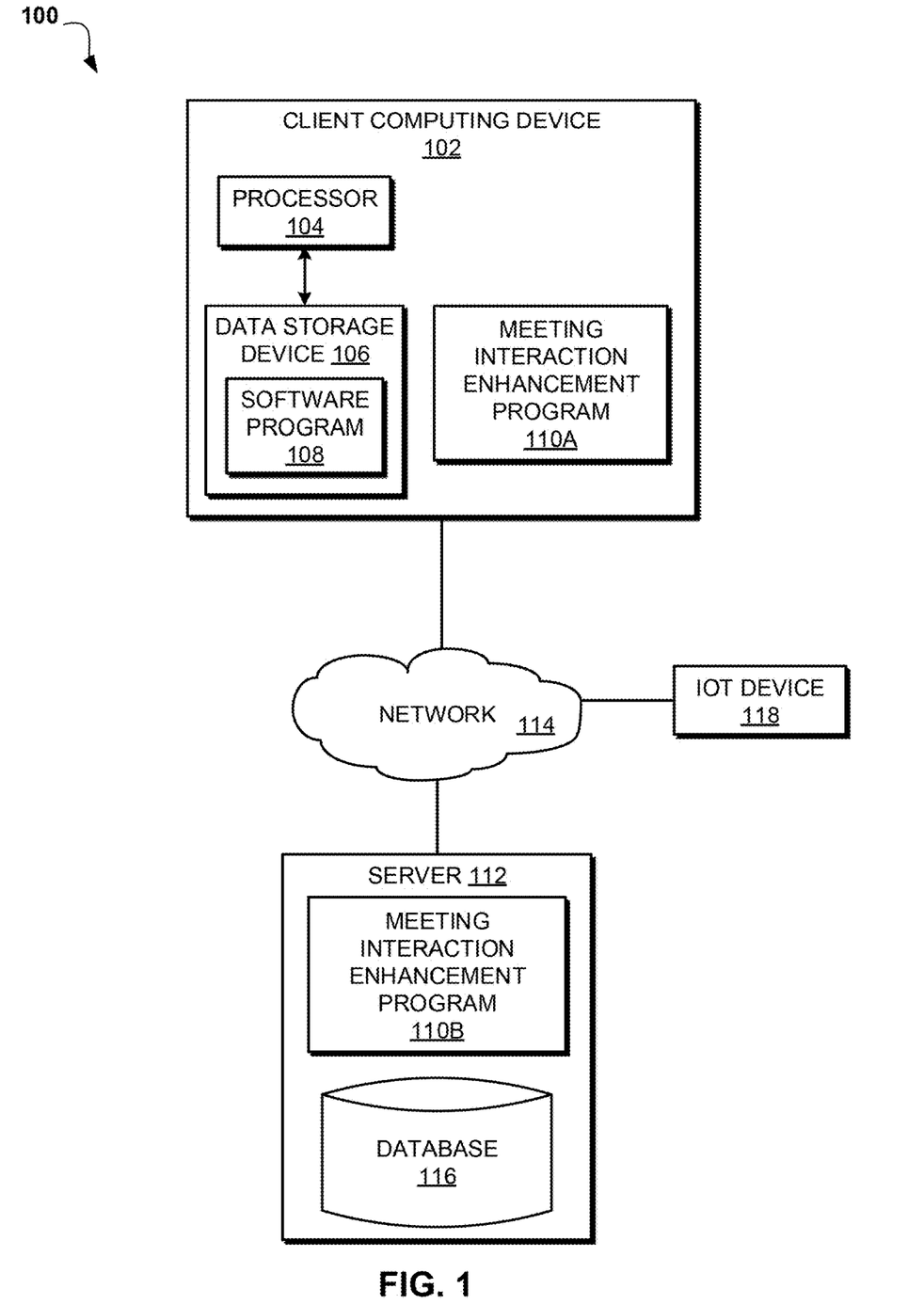
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a meeting interaction enhancement program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a meeting interaction enhancement program 110B and a database 116 and communicating with the client computing device 102 and IoT Device 118 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a smart band, smart watch, smart sneaker, location sensor, motion sensor, heart rate sensor, a camera and/or microphone embedded in or external to the client computing device 102, and/or any other IoT Device 118 known in the art for capturing an intent of the user to participate in the online collaborative meeting that is capable of connecting to the communication network 114, and transmitting and receiving data with the client computing device 102 and the server 112.

According to the present embodiment, the meeting interaction enhancement program 110A, 110B may be a program capable of receiving permission from a user to monitor an IoT Device 118, determining whether the user intends to participate in an online collaborative meeting, assigning a time interval for which the user is able to participate in the meeting, maintaining efficiency and productivity during the meeting, reducing background noises emanating from devices of non-participating users, and automatically unmuting and muting microphones on the devices of the users when a particular user is speaking and finished speaking, respectively. The meeting interaction enhancement method is explained in further detail below with respect to FIG. 2.

Figure 2:
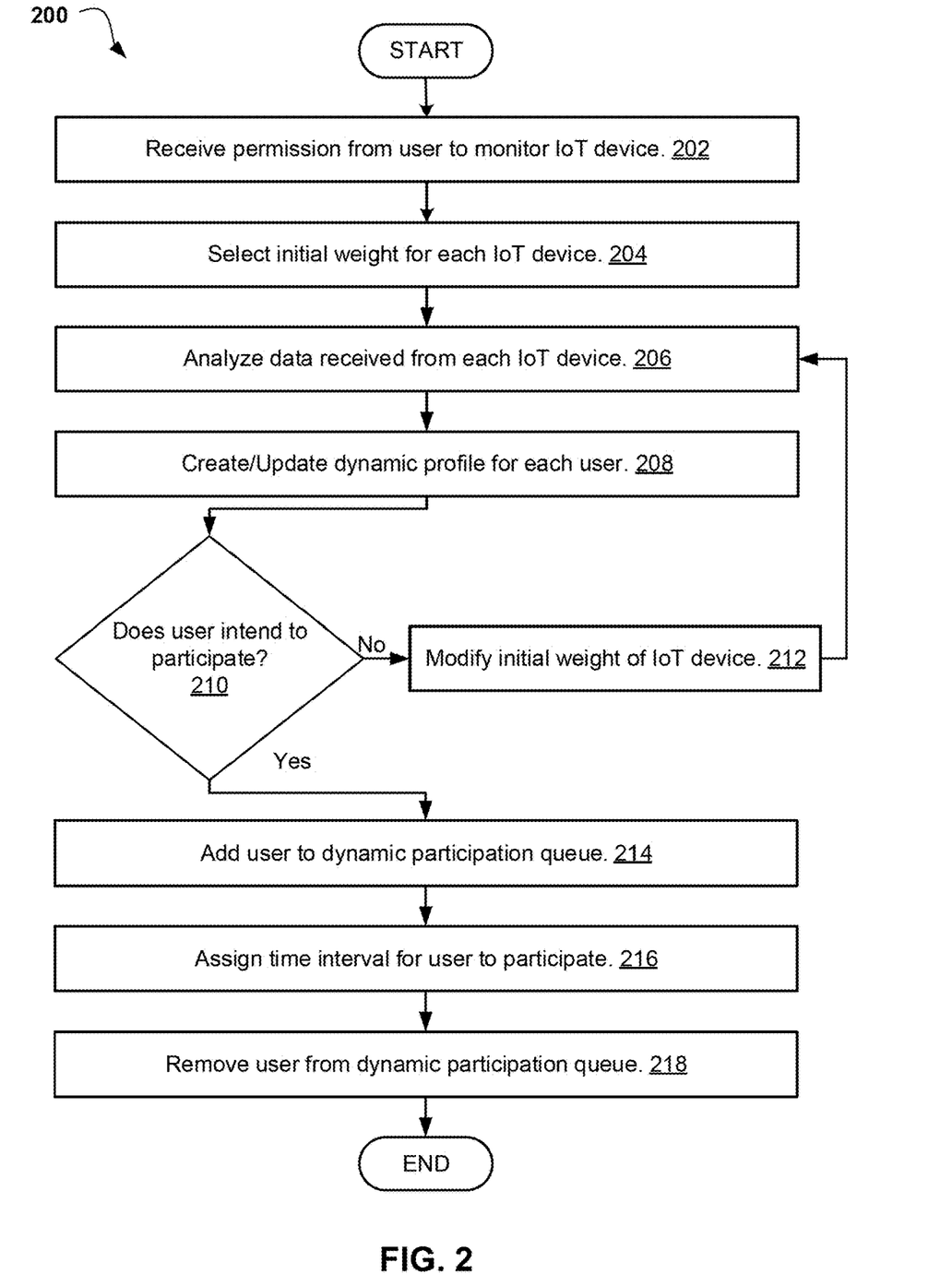
FIG. 2 illustrates an operational flowchart for profiling virtual conference attendees to enhance meeting interactions in an online collaborative meeting enhancement process according to at least one embodiment.

Referring now to FIG. 2, an operational flowchart for profiling virtual conference attendees to enhance meeting interactions in an online collaborative meeting enhancement process 200 is depicted according to at least one embodiment. At 202, the meeting interaction enhancement program 110A, 110B receives permission from the one or more users to monitor one or more IoT Devices 118 for data associated with each user during the online collaborative meeting. The one or more users may grant permission to monitor the one or more IoT Devices 118 via an interface on the client computing device 102 that is being used to access the online collaborative meeting. For example, when logging into a collaborative meeting application for a company meeting, a pop-up may be displayed to the one or more users asking permission to monitor their IoT Devices 118. As described above, examples of an IoT Device 118 include, but are not limited to, a smart band, smart watch, smart sneaker, location sensor, motion sensor, heart rate sensor, a camera and/or microphone embedded in or external to the client computing device 102, and/or any other IoT Device 118 known in the art for capturing an intent of the one or more users to participate in the online collaborative meeting. As used herein, "participate" means either a speaking role in the online collaborative meeting or any other interaction where one user is initiating communication with another user, e.g., typing into a text box and pressing "send." Examples of data associated with each user include, but are not limited to, heart rate, hand movements, facial gestures, eye movements, and/or volume and tone of voice. This data may be used in creating a dynamic user profile, described in further detail below with respect to step 208. When using an online collaborative meeting application, such as Cisco Webex® (Cisco Webex and all Cisco Webex-based trademarks and logos are trademarks or registered trademarks of Cisco Systems, Inc. and/or its affiliates), there may be a main presenter, i.e., a meeting host, and other attendees, i.e., the one or more users, may intend to participate at some point during the meeting. Details on determining an intent to participate are explained in further detail below with respect to step 210.

Then, at 204, the meeting interaction enhancement program 110A, 110B selects the initial weight for the one or more IoT Devices 118. The initial weight is selected in response to receiving permission from the one or more users. The initial weight selected for the one or more IoT Devices 118 may be an identical weight for each IoT Device 118. For example, if a user is connected to a microphone, a camera, and a motion detector, the initial weight may be 33% for each of the microphone, the camera, and the motion detector. Additionally, there may be a smart watch. Thus, the initial weight may be 25% for each of the microphone, the camera, the motion detector, and the smart watch. These initial weights and their modifications, described in further detail below with respect to step 212, may be displayed to the one or more users via a graphical user interface (GUI), described in further detail below with respect to step 214. For example, the one or more IoT Devices 118 and their weights may be displayed in a list such as:

"Mic: 33%"
"Camera: 33%"
"Motion: 33%"

Next, at 206, the meeting interaction enhancement program 110A, 110B analyzes the data for the trigger event. A trigger event may be an anomaly or change detected in a steady stream of data. Once permission is granted in step 202, the one or more IoT Devices 118 may analyze the one or more users throughout the duration of the online collaborative meeting. The data received from the one or more IoT Devices 118 may then be analyzed by the meeting interaction enhancement program 110A, 110B. The trigger event may be one or more of the following:

According to at least one embodiment, the trigger event may be an increased heartrate of the one or more users. For example, for the first hour of the online collaborative meeting, the heartrate sensor may detect a user has a heartrate of 60 beats per minute. At one hour and five minutes into the collaborative online meeting, the heartrate may jump to 120 beats per minute. This change in heartrate may be interpreted by the meeting interaction enhancement program 110A, 110B to be a trigger event.

According to at least one other embodiment, the trigger event may be a detected change in gestures made by the one or more users, such as a hand gestures, facial gestures, body movements, and/or eye movements. For example, for the first hour of the online collaborative meeting, the camera and smart watch may detect a user is sitting calmly with their hands on their lap. At one hour and ten minutes into the online collaborative meeting, the user may point to their screen. This change in activity may be interpreted by the meeting interaction enhancement program 110A, 110B to be a trigger event. Continuing the example, for the first hour of the online collaborative meeting, the camera may detect the user is looking intently at their screen. At one hour and twenty minutes into the online collaborative meeting, the user may look away from the screen. This may also be interpreted to be a trigger event. Similarly, the smart sneaker may detect the user is walking, indicating another trigger event.

According to at least one further embodiment, the trigger event may be a detected change in the volume or tone of voice of the one or more users. For example, for the first hour of the online collaborative meeting, the microphone may detect a user is silently listening to the meeting host. At one hour and ten minutes into the online collaborative meeting, the user may begin talking at a high volume in an excited manner. This change in volume and tone of voice may be interpreted by the meeting interaction enhancement program 110A, 110B to be a trigger event.

The embodiments described above are not intended to be limiting. Data relating to any behaviors and/or biometrics of the one or more users may be captured by the one or more IoT Devices 118 and analyzed for a trigger event. This data may be used in determining whether the one or more users intend to participate in the online collaborative meeting, described in further detail below with respect to step 210.

Then, at 208, the meeting interaction enhancement program 110A, 110B creates a dynamic profile for each user attending the online collaborative meeting. The dynamic profile may be created based on the analysis of the data received from the one or more IoT Devices 118. As described above, the data associated with each user, such as heart rate, hand movements, facial gestures, eye movements, and/or volume and tone of voice and the detected trigger events may be included in the dynamic profile and stored in a database, such as database 116 or the databases described in FIG. 3 below. Historical data associated with each user may also be included in the dynamic profile and stored separately from the real-time data received in the current online collaborative meeting. As used herein, "historical data" is either a prior online collaborative meeting or a configurable elapsed period of time in a real-time online collaborative meeting. For example, in a real-time online collaborative meeting, a user may set a benchmark of one hour prior to a current time in the meeting for which data is to be treated as historical. Continuing the example above, if the heartrate of the user is 60 beats per minute for the first hour of the real-time online collaborative meeting, and then increases to 100 beats per minute at one hour and ten minutes into the meeting, then 60 beats per minute may be treated as historical data by the meeting interaction enhancement program 110A, 110B. The profile is dynamic in that it may be updated with data obtained from successive online collaborative meetings, described in further detail below with respect to step 210. Additional information that may be stored in the dynamic profile includes, but is not limited to, times at which the one or more users participated in the prior online collaborative meeting as well as topics discussed in the prior online collaborative meeting and/or the real-time online collaborative meeting.

Next, at 210, the meeting interaction enhancement program 110A, 110B determines whether the one or more users intend to participate in the online collaborative meeting. The determination is made based on the analysis of the data for the trigger event described above with respect to step 206.

According to at least one embodiment, each trigger event detected in the real-time online collaborative meeting may be compared with a corresponding trigger event in the prior online collaborative meeting to determine whether the one or more users intend to participate. For example, if a trigger event was detected at one hour and twenty minutes into the real-time online collaborative meeting, the meeting interaction enhancement program 110A, 110B may determine whether a similar trigger event was detected at approximately one hour and twenty minutes into the prior online collaborative meeting. Continuing the example, in the real-time online collaborative meeting, the user pointed at the screen at one hour and twenty minutes into the meeting. In the prior online collaborative meeting, the user pointed at the screen at one hour and fifteen minutes into the meeting. In this instance, the corresponding trigger events occurred at approximately the same time in both meetings. It may be appreciated that in embodiments of the present invention, the approximate time in which to consider corresponding trigger events may be configured by the one or more users or the meeting host, e.g., ten minutes. If the user participated in the prior online collaborative meeting after pointing their finger at the screen, it may be determined with substantial confidence that the user intends to participate in the real-time online collaborative meeting, e.g., the participation confidence score is at least 80%. Similarly, if the user did not participate in the prior online collaborative meeting after pointing their finger at the screen, it may be determined with substantial confidence that the user does not intend to participate in the real-time online collaborative meeting. If the corresponding trigger events are outside of the approximate times, e.g., more than ten minutes apart, the participation confidence score may fall below the 80% threshold. In such cases where the participation confidence score falls below the threshold, the meeting interaction enhancement program 110A, 110B may ask each user whose score fell below the threshold if they intend to participate. It may be appreciated that the participation confidence score threshold is configurable and can be set greater than or less than 80% by the one or more users or meeting host.

According to at least one other embodiment, a trigger event in and of itself in the real-time online collaborative meeting may be used to determine whether the one or more users intend to participate. For example, if a trigger event was detected at one hour and twenty minutes into the real-time online collaborative meeting, the meeting interaction enhancement program 110A, 110B may determine an intent to participate or an intent not to participate. Continuing the example, if the eyes of the user are looking away from the screen, the meeting interaction enhancement program 110A, 110B may interpret that the user is disinterested in the online collaborative meeting and does not wish to participate. Conversely, if the heartrate of the user increases to 120 beats per minute from 60 beats per minute, it may be interpreted that the user is excited and anxious and therefore intents to participate. In this embodiment, the meeting interaction enhancement program 110A, 110B may ask each user for whom a trigger event was detected whether they intend to participate, since historical data is not being considered. However, once the user responds they would like to participate or would not like to participate, then the trigger event which prompted the asking may be added to the dynamic user profile and used for a future online collaborative meeting.

In response to determining at least one of the one or more users intend to participate (step 210, "Yes" branch), the online collaborative meeting enhancement process 200 may proceed to step 214 to add the at least one user to the dynamic participation queue. In response to determining at least one of the one or more users do not intend to participate (step 210, "No" branch), the online collaborative meeting enhancement process 200 may proceed to step 212 to modify the initial weight of the one or more IoT Devices 118 that detected the trigger event for the at least one user who did not intend to participate.

Then, at 212, the meeting interaction enhancement program 110A, 110B modifies the initial weight of the one or more IoT Devices 118 that detected the trigger event for the at least one user who did not intend to participate. As described above with respect to step 204, the initial weight selected for the one or more IoT Devices 118 may be an identical weight for each IoT Device 118. For example, if a user is connected to a microphone, a camera, and a motion detector, the initial weight may be 33% for each of the microphone, the camera, and the motion detector. Continuing the example, the microphone may have detected the trigger event which prompted the meeting interaction enhancement program 110A, 110B to ask the user if they intend to participate. Since the user said they do not intend to participate, the initial weight selected for the microphone may be reduced, for example, from 33% to 20%. This modification may be made so that less attention is focused on the microphone. For example, a user may simply be talking to someone else in their home, and even though their voice is picked up by the microphone, they may not intend to participate in the online collaborative meeting. Thus, if the user speaks again, the speaking may not be interpreted to be a trigger event. If the initial weight of the microphone is reduced, then the initial weight of the other IoT Devices may be increased. For example, the weights of the microphone, the camera, and the motion detector may be 20%, 40%, and 40%, respectively. As illustrated in FIG. 2, if the user does not intend to participate, the online collaborative meeting enhancement process 200 proceeds back to step 206 to continue analyzing the data for a trigger event. This process may continue until the user does intend to participate, in which case the online collaborative meeting enhancement process 200 may proceed to step 214 to add the user to the dynamic participation queue, or until the online collaborative meeting ends. Each time the user indicates they do not intend to participate, the weight for the IoT Device 118 that detected may be further reduced. For example, the weight of the microphone may be reduced from 33% to 20%, and then to 10%. The changes in weights may also be added to the dynamic user profile.

Next, at 214, the meeting interaction enhancement program 110A, 110B adds the at least one user who did intent to participate to the dynamic participation queue. The queue is dynamic in that it may constantly be updated. Once the at least one user who did intend to participate is added to the dynamic participation queue, the weight of the IoT Device 118 for that at least one user that detected the trigger event may be increased. This is in contrast to step 212 in which the weight was reduced. For example, if the heartrate sensor detected the trigger event and the meeting interaction enhancement program 110A, 110B determined the user intends to participate and the user confirmed they intend to participate, the weight of the heartrate sensor may be increased from 33% to 50%. In this manner, more attention is focused on the heartrate sensor. In embodiments of the present invention, the one or more users may add themselves to the dynamic participation queue even if no trigger event for those users was detected.

The dynamic participation queue may be a GUI. The GUI may include a list of each user who was added to the dynamic participation queue, together with a priority to participate and a colored icon indicating participation status and intent displayed adjacent to each user who was added to the dynamic participation queue. The GUI is described in further detail blow with respect to FIG. 4.

Then, at 216, the meeting interaction enhancement program 110A, 110B assigns a time interval for which each user in the dynamic participation queue is able to participate. The time interval may be assigned in response to adding at least one user to the dynamic participation queue. The time interval may be based on how long the user participated in a prior online collaborative meeting. For example, if in a prior online collaborative meeting the user participated for five minutes, the default time interval assigned in the real-time online collaborative meeting may also be five minutes. For each user added to the dynamic participation queue, the microphone may be automatically unmuted when it is time for the user to participate. It may be appreciated that the time interval may be flexible, and that participation may be longer than the default time interval assigned. For example, if in a prior online collaborative meeting the user participated for five minutes, then in the real-time online collaborative meeting the user may participate for ten minutes if they choose.

Next, at 218, the meeting interaction enhancement program 110A, 110B removes a particular user of the at least one user from the dynamic participation queue after the time interval for the particular user has elapsed. As described above with respect to step 216, even though a particular user may be removed from the dynamic participation queue, the user may still participate in the online collaborative meeting if they choose. Once the particular user is removed from the queue and finished participating, the microphone of the finished user may be automatically muted so that the next user may participate with minimal background noise. In embodiments of the present invention, the one or more users who were automatically added to the dynamic participation queue may remove themselves from the queue if they change their mind about participating.

Figure 3:
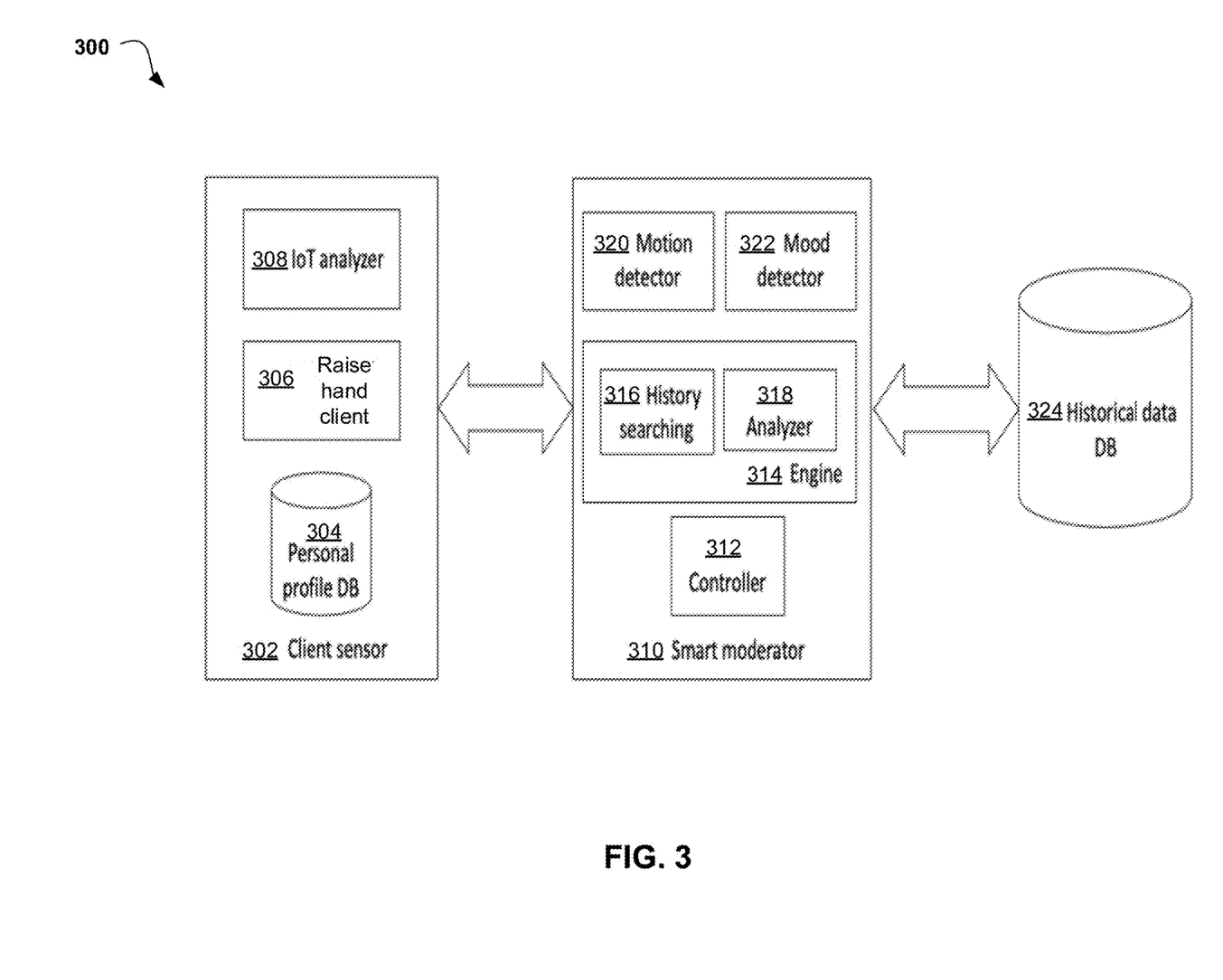
FIG. 3 is a diagram depicting an interaction between solution components of the process in FIG. 2 according to at least one embodiment.

Referring now to FIG. 3, a diagram 300 depicting an interaction between solution components of the process in FIG. 2 is shown according to at least one embodiment. The client sensor module 302 may run on each user's client computing device 102 (FIG. 1) and may be used in creating the dynamic user profile. The client sensor module 302 includes a personal profile database 304, a raise hand client 306, and an IoT analyzer 308. The personal profile database 304 may store the most current data associated with each user during the online collaborative meeting. The raise hand client 306 may be the dynamic participation queue which displays the order in which the one or more users added to the queue may participate. The raise hand client 306 may also be responsible for muting and unmuting the microphones of the one or more users in the queue. The IoT analyzer 308 may broadly categorize the types of data received. For example, the IoT analyzer 308 may categorize data as voice data, heartrate data, and face gestures data. The IoT analyzer 308 may also select the initial weight for the one or more IoT Devices 118 (FIG. 1). The smart moderator module 310 may connect to the client sensor module 302 and includes a controller 312, an engine 314, which may be composed of a history search component 316 and an analyzer 318, a motion detector 320, and a mood detector 322. The controller 312 may rank the one or more users and determine their speaking priority. The engine 314 may include the history search component 316 and the analyzer 318 and compares the historical data with the real-time data. The historical data may be retrieved from a historical data database 324 which connects to the history search component 316 in the smart moderator module 310. If any user is new, i.e., they do not have a dynamic user profile, the history search component 316 may connect to the personal profile database 304 and create the dynamic user profile. The motion detector 320 may detect certain movements of the user such as eye movements, hand movements, body movements, and facial movements. A volume and tone of voice may be detected by the mood detector 322. The data received from the motion detector 320 and the mood detector 322 may be fed to the analyzer 318 for analysis and interpretation. The historical data database 324 may store the historical data received from prior online collaborative meetings. Information on when the user participated, the topic in which the user participated, and the time interval of participation may all be stored in the historical data database 324 and used for analysis in a future online collaborative meeting.

Figure 4:
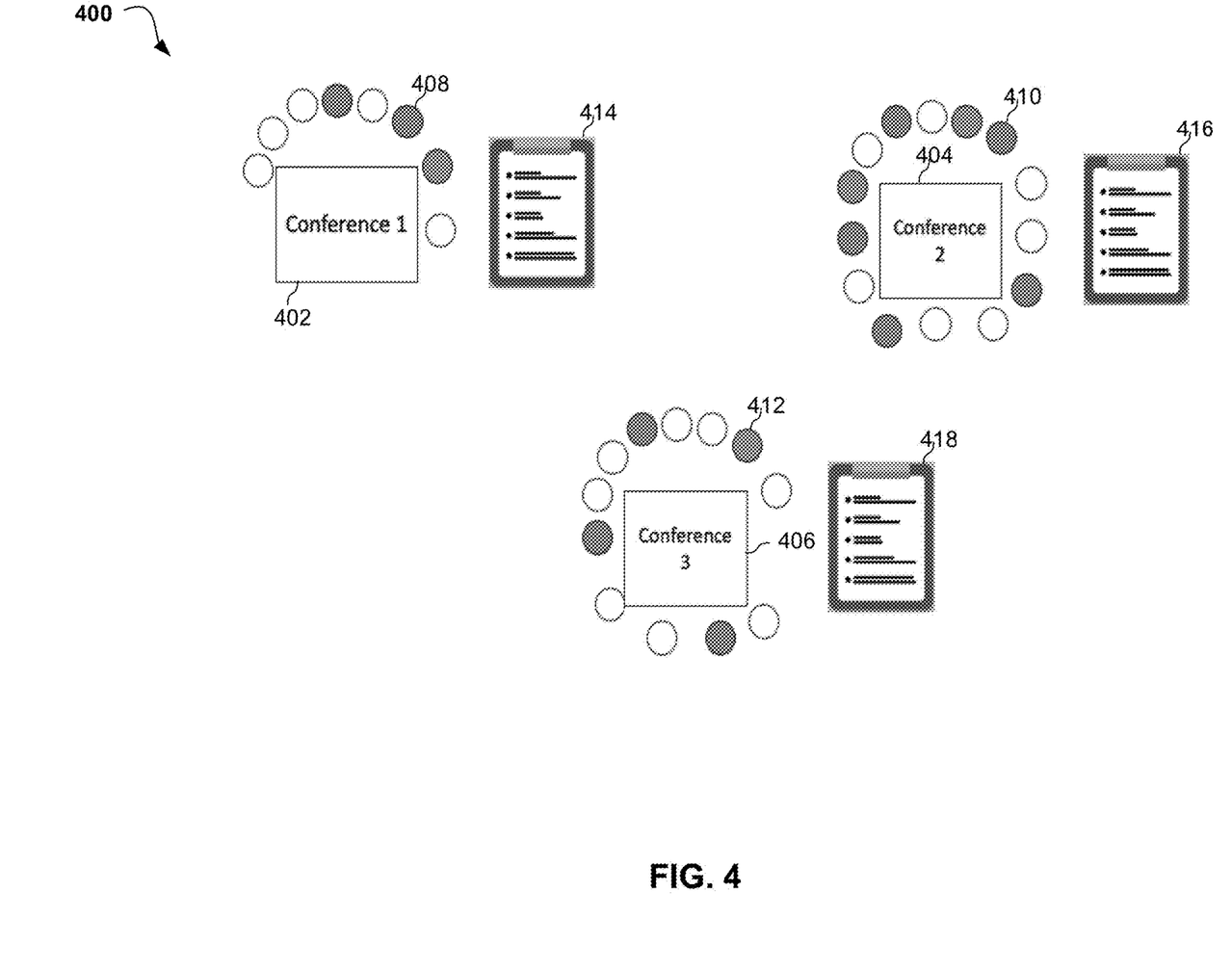
FIG. 4 is a diagram depicting virtual conferences and interface dashboards that are available to the participants according to at least one embodiment.

Referring now to FIG. 4, a diagram 400 depicting virtual conferences 402, 404, and 406 and interface dashboards 414, 416, and 418 that are available to the participants is shown according to at least one embodiment. Virtual conferences 402, 404, and 406 may be three conferences occurring simultaneously with different users or may be a historical progression of conferences with the same users. The interface dashboards 414, 416, and 418 may be the GUI described above with respect to step 214 in FIG. 2. The GUI, i.e., interface dashboards 414, 416, and 418, may include a list of the users who intend to participate in the online collaborative meeting as well as a list of all attendees in the meeting. The users may be ranked in order of priority to participate and that ranking may be displayed adjacent to each of the users. For example, Mary may have a "1" adjacent to her name in the list, Bob may have a "2" adjacent to his name in the list, and James may have a "3" adjacent to his name in the list. Priority may be determined based on the participation confidence score. For example, Mary's score was 90% and Bob's score was 85%. Therefore, Mary may have priority over Bob. Alternatively, priority may simply be based on when the users were added to the interface dashboards 414, 416, and 418. For example, if Mary's trigger event was detected before Bob's trigger event, Mary may have priority over Bob. If noise is detected in the background of a user who is up next to participate, that user may have their priority reduced so as not to disrupt the flow of the online collaborative meeting. Once the background noise is no longer detected, the priority of the user may be restored to next up to participate. Furthermore, the interface dashboards 414, 416, and 418 may include colored icons 408, 410, and 412 indicating participation status and intent to participate of each user. For example, if Bob is the active participant, Bob may have a solid green icon 408 adjacent to his name in the list. If Mary has a participation confidence score of 90%, Mary may have a solid blue icon 410 adjacent to her name in the list, indicating she will most likely participate. Finally, Tim may have no intent to participate at all during the online collaborative meeting. Thus, Tim may have a white icon 412 adjacent to his name in the list.

It may be appreciated that FIGS. 2-4 provide only an illustration of one implementation and do not imply any limitations with regard to how different embodiments may be implemented. Many modifications to the depicted environments may be made based on design and implementation requirements.

Figure 5:
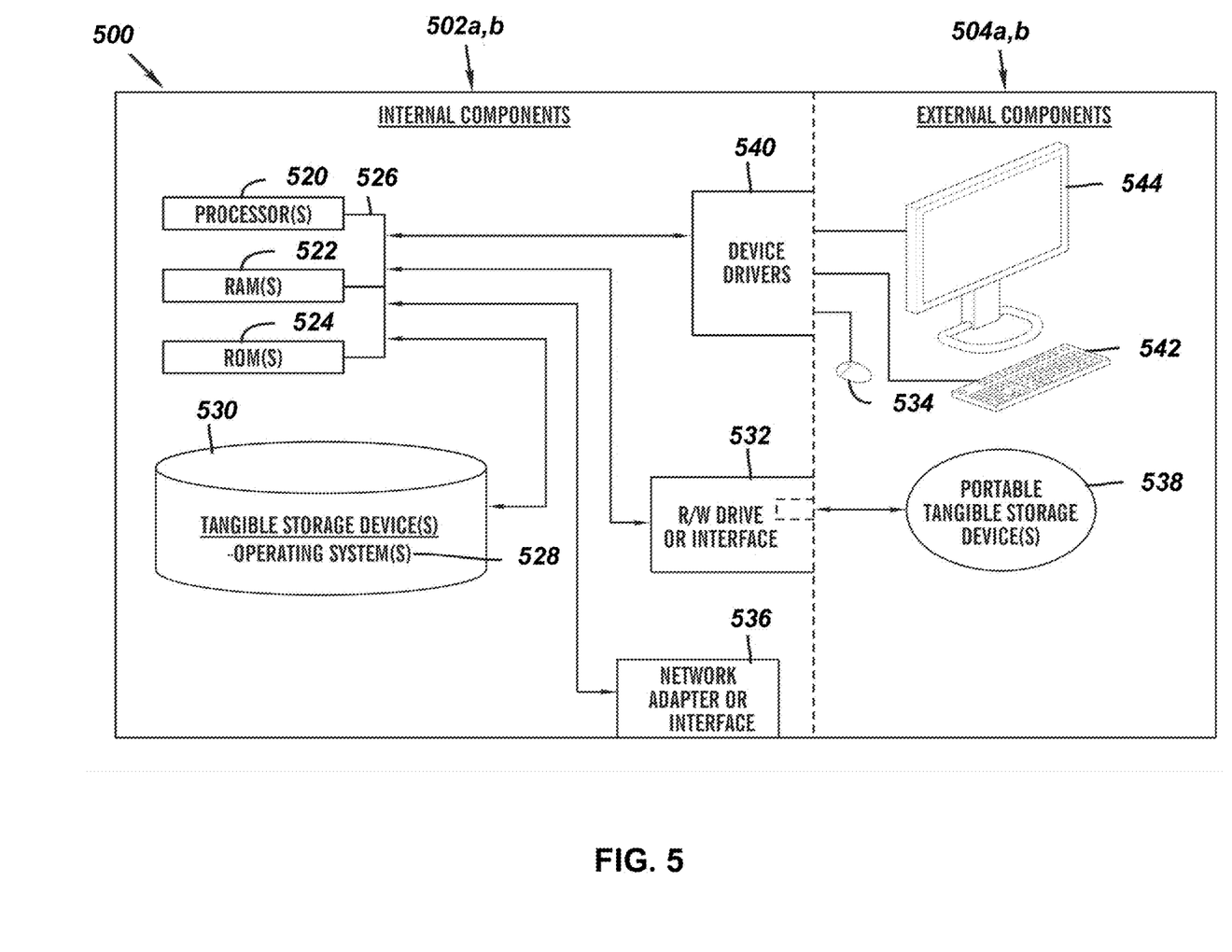
FIG. 5 is a functional block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the meeting interaction enhancement program 110A in the client computing device 102 and the meeting interaction enhancement program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the meeting interaction enhancement program 110A, 110B, can be stored on one or more of the respective portable computer-readable tangible storage devices 538, read via the respective R/W drive or interface 532, and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the meeting interaction enhancement program 110A in the client computing device 102 and the meeting interaction enhancement program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the meeting interaction enhancement program 110A in the client computing device 102 and the meeting interaction enhancement program 110B in the server 112 are loaded into the respective hard drive 530. The network may comprise copper wires, optical fibers, wireless transmission, routers, firewalls, switches, gateway computers and/or edge servers.

Each of the sets of external components 504 a,b can include a computer display monitor 544, a keyboard 542, and a computer mouse 534. External components 504 a,b can also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
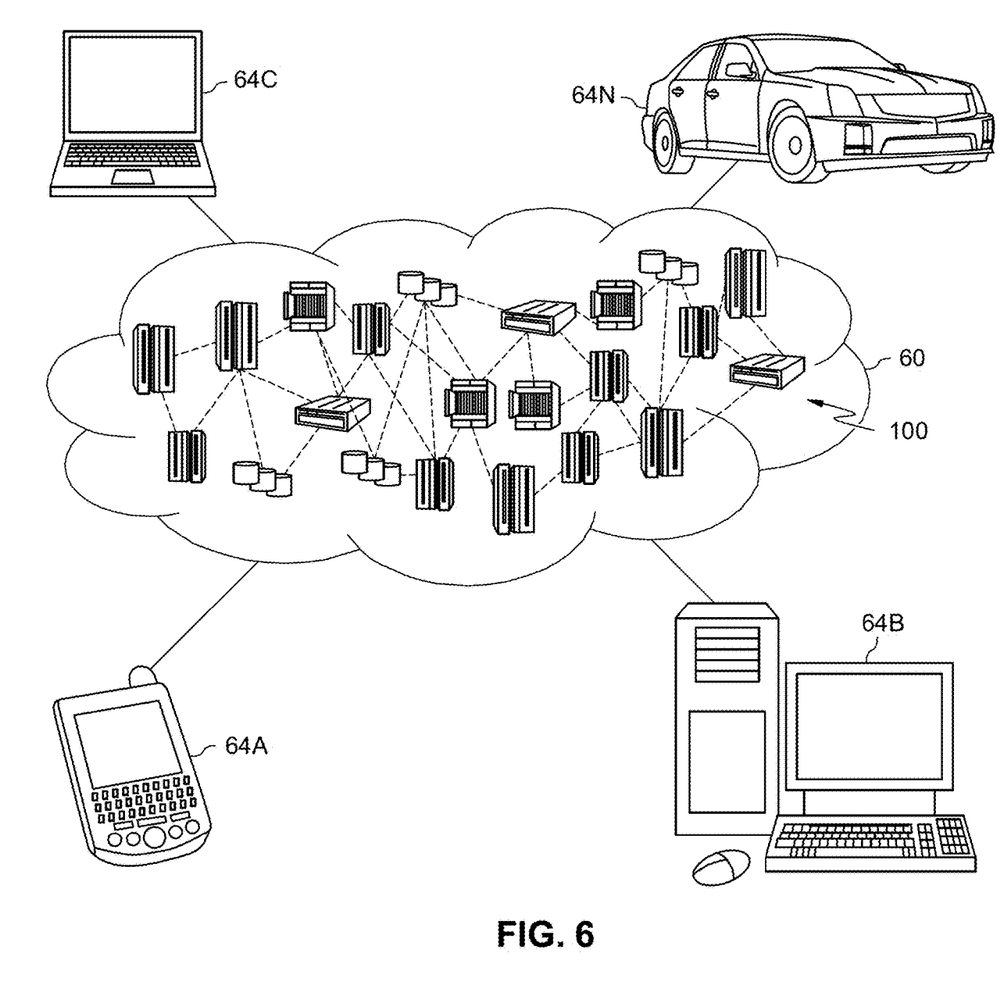
FIG. 6 depicts a cloud computing environment according to an embodiment of the present invention.

Referring now to FIG. 6, illustrative cloud computing environment 60 is depicted. As shown, cloud computing environment 60 comprises one or more cloud computing nodes 100 with which local computing devices used by cloud consumers, such as, for example, personal digital assistant (PDA) or cellular telephone 64A, desktop computer 64B, laptop computer 64C, and/or automobile computer system 64N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 6 are intended to be illustrative only and that computing nodes 100 and cloud computing environment 60 can communicate with any type of computerized device over any type of network and/or network addressable connection (e.g., using a web browser).

Figure 7:
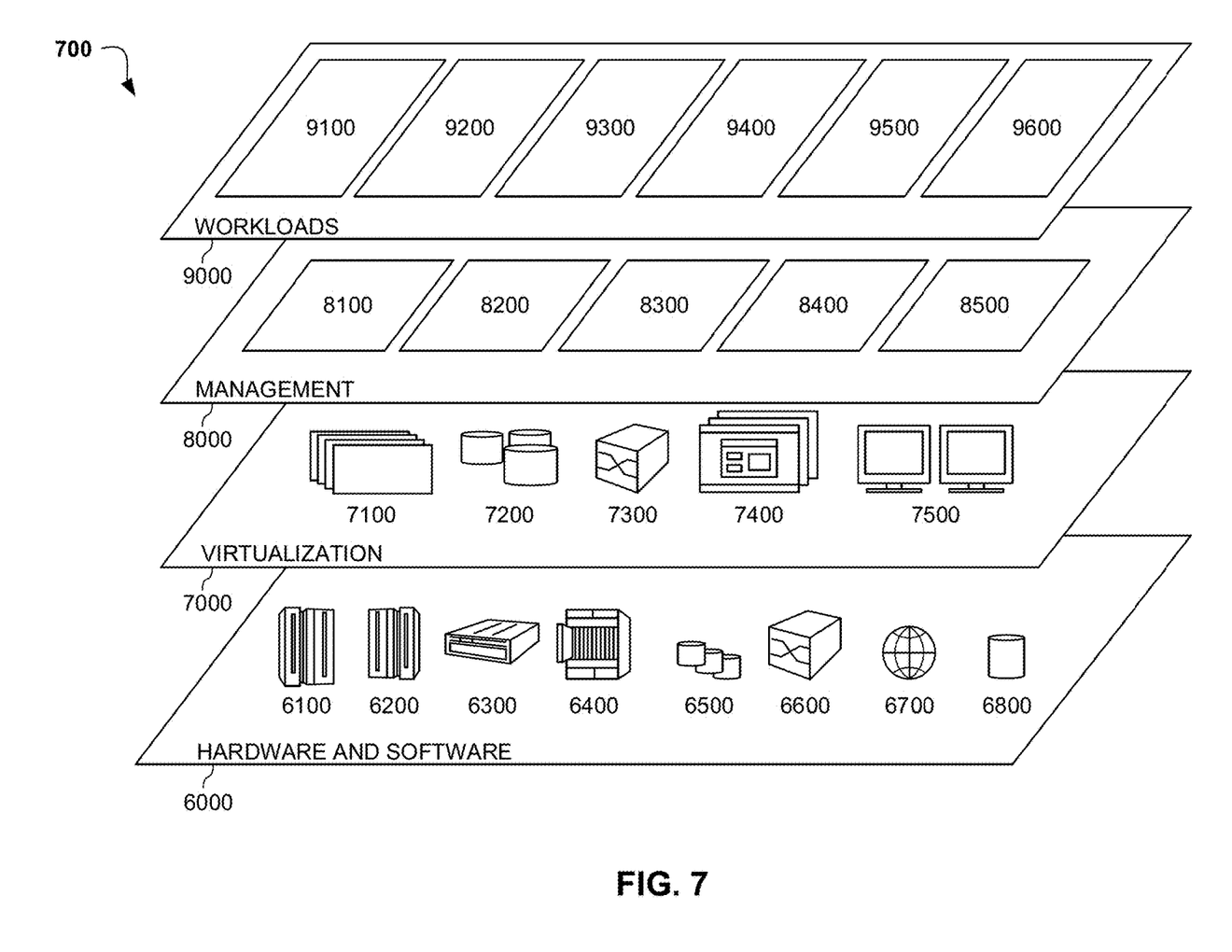
FIG. 7 depicts abstraction model layers according to an embodiment of the present invention.

Referring now to FIG. 7, a set of functional abstraction layers 700 provided by cloud computing environment 60 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6000 includes hardware and software components. Examples of hardware components include: mainframes 6100; RISC (Reduced Instruction Set Computer) architecture based servers 6200; servers 6300; blade servers 6400; storage devices 6500; and networks and networking components 6600. In some embodiments, software components include network application server software 6700 and database software 6800.

Virtualization layer 7000 provides an abstraction layer from which the following examples of virtual entities may be provided: virtual servers 7100; virtual storage 7200; virtual networks 7300, including virtual private networks; virtual applications and operating systems 7400; and virtual clients 7500.

In one example, management layer 8000 may provide the functions described below. Resource provisioning 8100 provides dynamic procurement of computing resources and other resources that are utilized to perform tasks within the cloud computing environment. Metering and Pricing 8200 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 8300 provides access to the cloud computing environment for consumers and system administrators. Service level management 8400 provides cloud computing resource allocation and management such that required service levels are met. Service Level Agreement (SLA) planning and fulfillment 8500 provide pre-arrangement for, and procurement of, cloud computing resources for which a future requirement is anticipated in accordance with an SLA.

Workloads layer 9000 provides examples of functionality for which the cloud computing environment may be utilized. Examples of workloads and functions which may be provided from this layer include: mapping and navigation 9100; software development and lifecycle management 9200; virtual classroom education delivery 9300; data analytics processing 9400; transaction processing 9500; and profiling virtual conference attendees to enhance meeting interactions 9600. Profiling virtual conference attendees to enhance meeting interactions 9600 may relate to detecting an intent of a user to participate in an online collaborative meeting in order to add the user to a dynamic participation queue.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of profiling virtual conference attendees to enhance meeting interactions, the method comprising:
   receiving permission from one or more users to monitor one or more IoT devices for data associated with each user during an online meeting;
   selecting an initial weight for the one or more IoT devices in response to receiving permission from the one or more users;
   analyzing the data for a trigger event;
   determining whether the one or more users intend to participate in the online meeting based on the analysis of the data for the trigger event;
   in response to determining at least one of the one or more users intend to participate, adding the at least one user to a dynamic participation queue; and
   assigning a time interval for which each user in the dynamic participation queue is able to participate in response to adding the at least one user to the dynamic participation queue.

2. The method of claim 1, further comprising:
   removing a particular user of the at least one user from the dynamic participation queue after the time interval for the particular user has elapsed, wherein upon being removed from the dynamic participation queue, a microphone on a device of the particular user is muted.

3. The method of claim 1, further comprising:
   in response to determining at least one of the one or more users do not intend to participate, modifying the initial weight of the one or more IoT devices that detected the trigger event for the at least one user who did not intend to participate.

4. The method of claim 1, wherein the initial weight selected for the one or more IoT devices is an identical weight for each IoT device.

5. The method of claim 1, wherein the dynamic participation queue in a graphical user interface (GUI), the GUI including:
   a list of each user who was added to the dynamic participation queue, together with a priority to participate and a colored icon indicating participation status and intent displayed adjacent to each user who was added to the dynamic participation queue.

6. The method of claim 1, wherein determining whether the one or more users intend to participate in the online meeting further comprises:
   asking each user whose participation confidence score falls below a threshold if they intend to participate.

7. The method of claim 1, further comprising:
   creating a dynamic profile for each user based on the analysis of the data received from the one or more IoT devices, wherein the one or more IoT devices are selected from a group consisting of a smart band, a smart watch, a motion sensor, a heart rate sensor, a camera, and a microphone.

8. A computer system, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   receiving permission from one or more users to monitor one or more IoT devices for data associated with each user during an online meeting;
   selecting an initial weight for the one or more IoT devices in response to receiving permission from the one or more users;
   analyzing the data for a trigger event;
   determining whether the one or more users intend to participate in the online meeting based on the analysis of the data for the trigger event;
   in response to determining at least one of the one or more users intend to participate, adding the at least one user to a dynamic participation queue; and
   assigning a time interval for which each user in the dynamic participation queue is able to participate in response to adding the at least one user to the dynamic participation queue.

9. The computer system of claim 8, further comprising:
   removing a particular user of the at least one user from the dynamic participation queue after the time interval for the particular user has elapsed, wherein upon being removed from the dynamic participation queue, a microphone on a device of the particular user is muted.

10. The computer system of claim 8, further comprising:
    in response to determining at least one of the one or more users do not intend to participate, modifying the initial weight of the one or more IoT devices that detected the trigger event for the at least one user who did not intend to participate.

11. The computer system of claim 8, wherein the initial weight selected for the one or more IoT devices is an identical weight for each IoT device.

12. The computer system of claim 8, wherein the dynamic participation queue in a graphical user interface (GUI), the GUI including:
    a list of each user who was added to the dynamic participation queue, together with a priority to participate and a colored icon indicating participation status and intent displayed adjacent to each user who was added to the dynamic participation queue.

13. The computer system of claim 8, wherein determining whether the one or more users intend to participate in the online meeting further comprises:
    asking each user whose participation confidence score falls below a threshold if they intend to participate.

14. The computer system of claim 8, further comprising:
    creating a dynamic profile for each user based on the analysis of the data received from the one or more IoT devices, wherein the one or more IoT devices are selected from a group consisting of a smart band, a smart watch, a motion sensor, a heart rate sensor, a camera, and a microphone.

15. A computer program product, the computer program product comprising:
    one or more computer-readable tangible storage medium and program instructions stored on at least one of the one or more tangible storage medium, the program instructions executable by a processor capable of performing a method, the method comprising:
    receiving permission from one or more users to monitor one or more IoT devices for data associated with each user during an online meeting;

selecting an initial weight for the one or more IoT devices in response to receiving permission from the one or more users;
analyzing the data for a trigger event;
determining whether the one or more users intend to participate in the online meeting based on the analysis of the data for the trigger event;
in response to determining at least one of the one or more users intend to participate, adding the at least one user to a dynamic participation queue; and
assigning a time interval for which each user in the dynamic participation queue is able to participate in response to adding the at least one user to the dynamic participation queue.

16. The computer program product of claim 15, further comprising:
removing a particular user of the at least one user from the dynamic participation queue after the time interval for the particular user has elapsed, wherein upon being removed from the dynamic participation queue, a microphone on a device of the particular user is muted.

17. The computer program product of claim 15, further comprising:
in response to determining at least one of the one or more users do not intend to participate, modifying the initial weight of the one or more IoT devices that detected the trigger event for the at least one user who did not intend to participate.

18. The computer program product of claim 15, wherein the initial weight selected for the one or more IoT devices is an identical weight for each IoT device.

19. The computer program product of claim 15, wherein the dynamic participation queue in a graphical user interface (GUI), the GUI including:
a list of each user who was added to the dynamic participation queue, together with a priority to participate and a colored icon indicating participation status and intent displayed adjacent to each user who was added to the dynamic participation queue.

20. The computer program product of claim 15, wherein determining whether the one or more users intend to participate in the online meeting further comprises:
asking each user whose participation confidence score falls below a threshold if they intend to participate.

* * * * *